United States Patent
Shimotsuma et al.

[11] Patent Number: 5,262,470
[45] Date of Patent: Nov. 16, 1993

[54] POLYESTER RESIN COMPOSITION

[75] Inventors: Sakae Shimotsuma, Atsugi; Tetsuya Shiozaki, Hachioji; Akihiro Suzuoka, Yokohama; Mie Sasaki, Sagamihara, all of Japan

[73] Assignee: Teijin Limited, Osaka, Japan

[21] Appl. No.: 789,083

[22] Filed: Nov. 7, 1991

[30] Foreign Application Priority Data

Nov. 7, 1990 [JP] Japan .................................. 2-299794
Jan. 30, 1991 [JP] Japan .................................. 3-027713

[51] Int. Cl.$^5$ ............................. C08K 5/03; H01B 1/06
[52] U.S. Cl. ..................................... 524/496; 524/495; 524/412; 252/511
[58] Field of Search ............. 524/496, 495, 412; 252/511

[56] References Cited

U.S. PATENT DOCUMENTS

| | | | |
|---|---|---|---|
| 4,057,514 | 11/1977 | Huschka et al. | 252/510 |
| 4,131,594 | 12/1978 | Nakamura et al. | 524/412 |
| 4,408,004 | 10/1983 | Pengilly | 524/496 |
| 4,477,608 | 10/1984 | Babler et al. | 524/512 |
| 4,803,114 | 2/1989 | Schledorn | 524/496 |
| 4,885,318 | 12/1989 | Danforth et al. | 524/412 |
| 4,909,961 | 3/1990 | Suzuki et al. | 524/496 |
| 4,912,158 | 3/1990 | Bohen et al. | 524/412 |
| 4,959,406 | 9/1990 | Foltin et al. | 524/496 |
| 5,034,439 | 7/1991 | Breitenfellner et al. | 524/412 |
| 5,086,098 | 2/1992 | Bohen et al. | 524/412 |
| 5,098,609 | 3/1992 | Iruvanti et al. | 252/511 |

FOREIGN PATENT DOCUMENTS

| | | | |
|---|---|---|---|
| 0087383 | 8/1983 | European Pat. Off. . | |
| 0101667 | 2/1984 | European Pat. Off. . | |
| 0330869 | 9/1989 | European Pat. Off. . | |
| 3544385 | 3/1987 | Fed. Rep. of Germany . | |
| 2-127449 | 5/1990 | Japan | 524/495 |
| 2-245055 | 9/1990 | Japan | 524/495 |

Primary Examiner—Paul R. Michl
Assistant Examiner—Olga Asinovsky
Attorney, Agent, or Firm—Sherman and Shalloway

[57] ABSTRACT

A polyester resin composition;
(A) which contains
  (a) a thermoplastic polyester resin, and
  (b) a carbon black and/or a graphite, and
(B) in which the content of the above component (b) is 0.001 to 2% by weight based on the total weight of the components (a) and (b). The polyester resin composition may further contain (c) a bromine-containing flame retardant, (d) an antimony-containing flame retardant aid and (e) an inorganic filler in addition to the components (a) and (b). This polyester resin composition permits marking of fine lines and precise print with a high contrast with a laser light.

28 Claims, 2 Drawing Sheets

POLYESTER RESIN COMPOSITION

DETAILED DESCRIPTION OF THE INVENTION

The present invention relates to a polyester resin composition which permits marking with laser light. When the polyester resin composition provided by the present invention is used, not only a molded article having a desired form can be produced, but also the marking can be easily made on the molded article with a YAG laser, a carbon dioxide gas laser, etc.

Most electric and electronic parts have prints made of a variety of inks on their outer surfaces for their identification and explanation of their functions. When a printing portion is made of a plastic, it is necessary to remove a mold lubricant, etc., which has been incorporated into a molding material, in order to facilitate the adhesion of an ink. It has been therefore the general practice to wash the plastic (entire parts) with freon.

From the viewpoint of prevention of the ozonosphere destruction, of course, the washing with freon is undesirable, and it is desired to develop innovative means. It must, however, be noted that the technique which allows the omission of the step of washing with freon is required to reduce the printing cost and technically meet with the requirement for making precise and fine prints. The marking with a laser has attracted attention as a printing technique which can overcome all of these problems simultaneously.

At present, a carbon dioxide gas laser and a YAG laser are mainly used as a laser marking apparatus. To perform the laser marking effectively, a plastic is required to be preliminarily modified into an easily photosensitive one. For example, Japanese Laid-Open Patent Publication No. 254743/1989 discloses the incorporation of either titanium oxide or a combination of titanium oxide with carbon black as means of improving the marking properties of a plastic for the marking with a YAG laser. It has been accordingly attempted to apply this means to thermoplastic polyesters. However, the incorporation of titanium oxide or carbon black into polyesters has not given any satisfactory result on the improvement in the marking properties. It has been further found that the marking with a carbon dioxide gas laser is not satisfactory presumably because a carbon dioxide gas laser has a small pulse energy. Therefore, as far as polyesters are concerned, there is no foreseeable forecast for alternative means to replace a conventional stamping method.

It is an object of the present invention to provide a polyester resin composition which permits the marking with laser light.

It is another object of the present invention to provide a polyester resin composition which exhibits a high contrast in the marking with a YAG laser or a $CO_2$ laser and which permits the marking of fine lines or precise prints.

The above and other objects and advantages of the present invention will be apparent from the following description.

The above objects and advantages of the present invention will be achieved, first, by a polyester resin composition;

(A) which contains (a) a thermoplastic polyester resin, and (b) a carbon black and/or a graphite, and (B) in which the content of the above component (b) is 0.001 to 2% by weight based on the total weight of the components (a) and (b).

That is, the present inventors have made a diligent study to develop a polyester resin composition having high marking properties and found the following. A polyester composition containing a crystalline graphite in the form of a scale, a particle or soil shows a remarkable contrast between a laser-irradiated portion and a laser-nonirradiated portion and permits the marking having an excellent contrast. On the basis of this finding, the present invention has been arrived at.

The thermoplastic polyester resin (a) used in the present invention refers to a substantially linear saturated polyester. For example, preferred are homopolymers or copolymers having one recurring unit or at least two different recurring units such as butylene terephthalate, ethylene terephthalate, butylene naphthalene dicarboxylate, and ethylene naphthalene dicarboxylate, or mixtures of these. Examples of the homopolymers are polybutylene terephthalate (PBT), polyethylene terephthalate (PET), polybutylene naphthalene dicarboxylate (PBN), polyethylene naphthalene dicarboxylate (PEN), and mixtures of these.

The above polyester resins are required to have an intrinsic viscosity with which the polyesters are moldable.

The component (b) used in the present invention includes a carbon black and/or a graphite.

The graphite (b) used in the present invention has a crystalline structure, and its average particle diameter is preferably in the range of from 0.1 to 150 $\mu$m. The form of the graphite (b) is scale-like, particulate, massive or a soil-like. Therefore, graphites, too, other than genuine graphites of hexagonal systems have marking properties and so can also be used in this invention. In the present invention, the graphite (b) is incorporated into the thermoplastic polyester resin (a) in such a proportion that the amount of the graphite (b) based on the total amount of these components (a) and (b) is 0.001 to 2% by weight. When the amount of the graphite is less than 10 ppm (0.001% by weight), the resultant polyester resin composition does not show any marking properties. The upper limit of the amount of the graphite is 2% by weight, since the marking effect is not improved any further even if it exceeds 2% by weight. It is also preferable to incorporate a small amount of the graphite in order to prevent an excess amount of the graphite from coloring a molded article.

The graphite used produces the marking effect even if used in a very small amount, since it has a very high absorptivity to laser light. Further, the graphite advantageously has low coloring properties as compared with carbon black. For example, 0.01% by weight of carbon black is incorporated into a polyester, the resultant composition is colored (turned dark gray), whereas a polyester containing the same amount of the graphite changes its color to a slight extent.

Meanwhile, the graphite produces an outstanding change (contrast) from a nonirradiated portion when irradiated with laser light. For example, a molded article formed from a composition containing 0.001 to 0.005% by weight of graphite is as white as a composition containing no graphite. Under irradation with a YAG laser, a portion marked by the YAG laser is turned black. That is, the portion irradiated with the laser light exhibits as high a contrast as that of stamps made of a black ink.

Meanwhile, as the amount of the graphite is increased, the composition color is changed from white to dark gray or black. When the amount is as large as 1 to 2% by weight, the composition is colored black. When this black composition (molded article) is irradiated with a laser, the irradiated (marked) portion turns white.

On the other hand, when a $CO_2$ laser is used, the irradiated (marked) portion turns white. It is therefore preferred to further incorporate not only a very small amount of graphite but also a pigment or dye which exhibits a color in order to produce a high contrast.

The carbon black (b) used in the present invention has high thermal conductivity, and preferred are those having a thermal conductivity of not less than 0.2 Kcal/m·hr·° C. These carbon blacks have characteristic features in that their graphite formation has advanced in the crystal structure or that these have a relatively bulky structure as a linear agglomerate, etc., formed in the secondary structure. The "marking" refers to a phenomenon that a resin heated under the irradiation with a laser is gasified and cured while retaining air bubbles. Therefore, an additive having high absorptivity to laser light and excellent thermal conductivity is effective for marking.

It can be said, therefore, that such a carbon black having high thermal conductivity is an additive having a high marking effect similar to graphite. Further, since the carbon black plays a role as a black pigment due to its high coloring properties, the amount of the graphite can be reduced, and yet a marking having a high contrast is made possible.

That is, the carbon black incorporated into a white or "colored" molded article has a great influence on its color tone (turns it blackish). It is therefore preferred to incorporate the carbon black alone or in combination with graphite when a molded article has a color of gray to black.

In the present invention, the carbon black (b) is incorporated into the thermoplastic polyester resin (a) in a such a proportion that the amount of the carbon black (b) based on the total amount of these components (a) and (b) is 0.001 to 2% by weight.

When the amount of the carbon black, if incorporated alone, is less than 10 ppm (0.001% by weight), the resultant polyester resin composition does not show any high-contrast marking properties. The upper limit of the amount of the carbon black is 2% by weight, since the marking effect is not improved any further even if it exceeds 2% by weight. It is also preferable to incorporate a small amount of the carbon black in order to prevent an excess amount of the carbon black from coloring a molded article.

A molded article containing 0.001 to 0.05% by weight of carbon black is colored gray, and a molded article containing more than 0.05% by weight of carbon black is colored black. Under the irradiation with a YAG laser, the marked portion is turned white.

On the other hand, when a $CO_2$ laser is used, the irradiated (marked) portion is also turned white, and the carbon black having high coloring properties shows a high contrast in the marking.

The polyester resin composition of the present invention may further contain (a) a bromine-containing flame retardant and (d) an antimony-containing flame retardant aid in addition to the above components (a) and (b).

Examples of the bromine-containing flame retardant (c) preferred in the present invention include a brominated bisphenol A type polycarbonate flame retardant (I), a brominated bisphenol A type epoxy resin and/or a modified product obtained by blocking part or all of the terminal glycidyl groups thereof (II), a brominated diphenyl ether flame retardant (III), a brominated imide flame retardant (IV) and brominated polystyrene flame retardant (V).

For example, compounds of the following formula (I) are preferred as the above brominated bisphenol A type polycarbonate flame retardant (I).

wherein:

$Y^1$ is $Y^2$ is

Xs are bromine atoms, n is an integer of 2 to 30, and each of i, j, k and h is an integer of 1 to 4.

For example, compounds of the following formula (II) are preferred as the above brominated bisphenol A type epoxy resin and/or modified product obtained by blocking part or all of the terminal glycicyl groups thereof (II).

wherein Xs are bromine atoms, each of i and j is an integer of 1 to 4, and m is an average polymerization degree ranging from 0 to 40.

For example, compounds of the following formula (III) are preferred as the above brominated diphenyl ether flame retardant (III).

wherein Xs are bromine atoms, and i' is an integer of 1 to 5.

For example, compounds of the following formula (IV) are preferred as the above brominated imide flame retardant (IV).

wherein Xs are bromine atoms, and i is an integer of 1 to 4.

For example, compounds of the following formula (V) are preferred as the above brominated polystyrene flame retardant (V).

wherein X is a bromine atom, i is an integer of 1 to 4, and l is an average polymerization degree ranging from 0 to 40.

Examples of the antimony-containing flame retardant aid (d) preferred in the present invention include $Sb_2O_3$ and/or $pNa_2O \cdot Sb_2O_5 \cdot qH_2O$ in which p is 0 to 1 and q is 0 to 4. These flame retardant aids are incorporated to improve the flame retarding effect. Although not specially limited, the particle diameter thereof is preferably 0.02 to 5 μm. The flame retardant aid may be surface-treated with an epoxy compound, a silane compound, an isocyanate compound, a titanate compound, or the like as required.

The above flame retardants of the formula (I) to (V) are known per se. The amount of the flame retardant based on the total amount of the components (a), (b), (c) and (d) is 2 to 25% by weight, preferably 8 to 20% by weight.

The amount of the flame retardant aid based on the above total amount is 2 to 15% by weight, preferably 4 to 10% by weight. It is preferred to incorporate the flame retardant aid in an amount of 20 to 70% by weight based on the flame retardant (c). When the amount of the flame retardant aid based on the above total amount exceeds 15% by weight, the flame retardant aid sometimes undesirably promotes the decomposition of the resin or the additive to decrease the strength of the resultant molded article.

The polyester resin composition of the present invention is preferably a composition;
(A) which contains
 (a) a thermoplastic polyester resin,
 (b) a carbon black having high thermal conductivity and/or a graphite,
 (c) a bromine-containing flame retardant, and
 (d) an antimony-containing flame retardant aid, and
(B) in which, based on the total amount of the components (a), (b), (c) and (d), the content of the component (a) is 58 to 96% by weight, the content of the component (b) is 0.001 to 2% by weight, the content of the component (c) is 2 to 25% by weight, and the content of the component (d) is 2 to 15% by weight.

The polyester resin composition of the present invention may contain not more than 70% by weight of an inorganic filler (e) as required. It is naturally preferred to incorporate other thermal stabilizer, pigment, phosphorus-containing flame retardant, etc., in combination with the inorganic filler. The inorganic filler (e) usable in the present invention is selected, for example, from fibrous materials such as glass fibers, carbon fibers, steel fibers, ceramic fibers, potassium titanate whiskers and boron whiskers; and powders, particulates or sheets of kaolin, clay, wollastonite, talc, mica, potassium carbonate, barium sulfate; glass beads, glass flakes, etc.

The polyester resin composition of the present invention can be easily produced by a known method generally used for the production of conventional resin compositions by means of known equipment generally used for the production of conventional resin compositions. For example, there are available (1) a method in which all the components are mixed and the mixture is melted, kneaded and extruded with an extruder to prepare pellets; (2) a method in which pellets of some of the above components and pellets of the remainders of the above components are separately prepared at first, and then all the pellets are mixed in predetermined amounts and molded to obtain a molded article having the intended composition; and (3) a method in which one or at least two of the above components are directly charged into a molding machine. It is also preferred to mix a fine powder of some of the above components with the remaining components, since these components can be uniformly mixed.

As described above, the present invention has made the following clear. A polyester resin composition containing 0.001 to 2.0% by weight of a graphite having an average particle diameter of 0.1 to 150 μm and a powdery, scale-like, soil-like or massive crystal structure has marking properties. When the polyester resin composition of the present invention is used, therefore, the marking with highly contrasting characters having a line width of 0.1 mm or less can be carried out with a YAG laser and a $CO_2$ laser. Further, the present invention has also made it clear that graphite and/or carbon black have/has high absorptivity to laser light so that the marking properties are improved even when these components are used in a very small amount, and that graphite and/or carbon black have/has low coloring properties so that these components do not limit the color tone of the resultant molded article.

The present invention will be detailed further hereinafter by reference to Examples.

In the present invention (Examples), the marking was carried out with a YAG laser and $CO_2$ laser.

Figure 1:
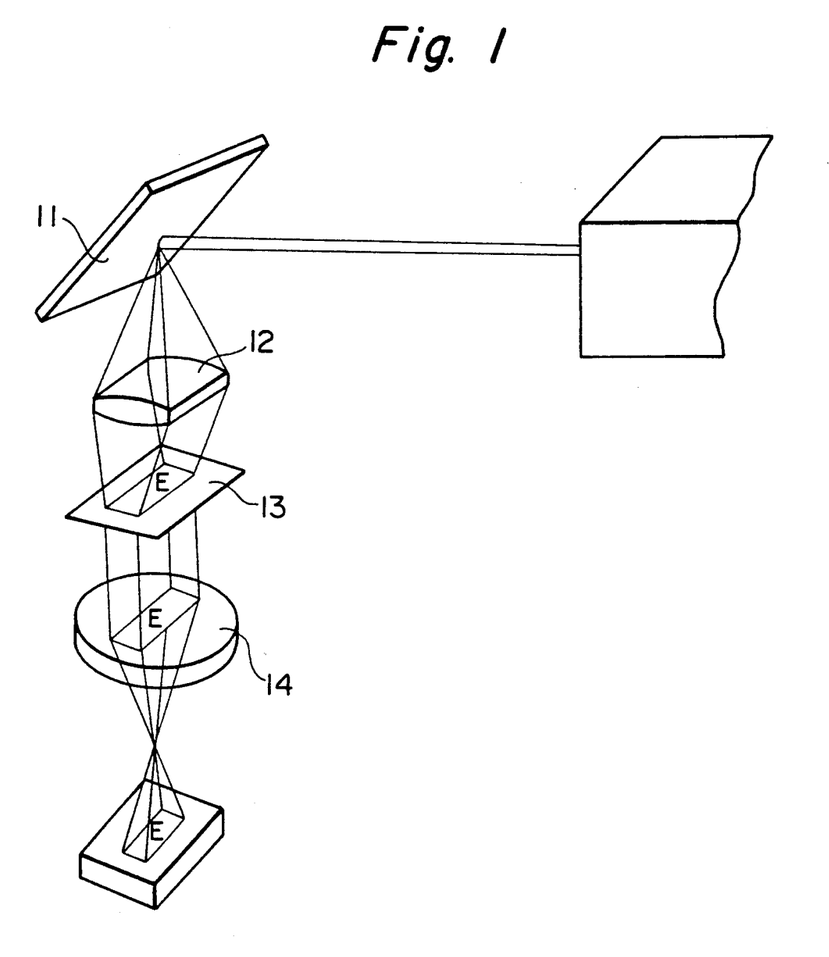
FIG. 1 is a schematic view showing the principle of irradiation of the surface of a molded article formed from a polyester resin composition of the present invention with a carbon dioxide gas laser.

(i) Marking method with carbon dioxide gas laser:

The marking was carried out on a molded article formed from a polyester resin composition containing a predetermined amount of graphite by a batch transfer mask method in which a mask for writing characters, symbols, marks, barcodes, etc., was prepared in advance, and mask pattern images were transferred to the surface of the above molded article by adjusting an image formation lens and irradiating the surface with a laser through the mask. To explain the procedure by reference to FIG. 1, the marking is carried out according to the following principle. In FIG. 1, laser light is reflected on a reflection mirror 11, and directed through a cylindrical lens 12, and an image is formed, through a stencil (mask) 13, on a molded article surface with a meniscus lens 14.

Figure 2:
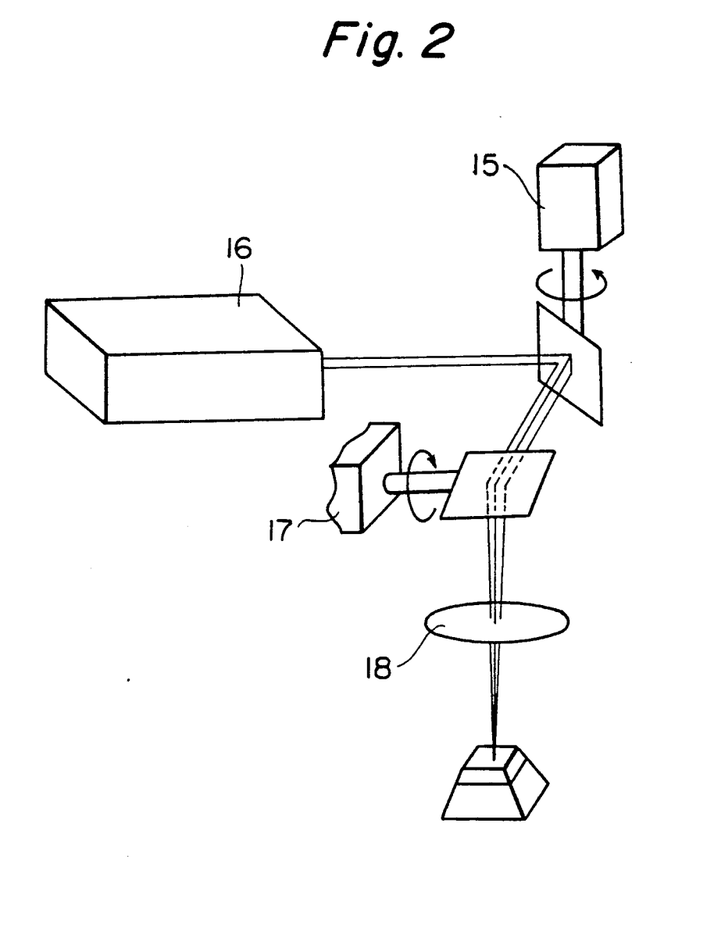
FIG. 2 is a schematic view showing the principle of irradiation of the surface of a molded article formed from a polyester resin composition of the present invention with a YAG laser.

(ii) Marking method with YAG laser:

The marking with a YAG laser was carried out according to the system shown in FIG. 2. Laser light emitted from a laser head 16 is guided through two deflection mirrors, and the marking is made on a molded article surface with a focus lens 18. In FIG. 2, numerals 15 and 17 indicate galvanometers for adjusting the deflection mirrors.

(iii) Evaluation of marking properties:

The marking properties were evaluated on a foaming state, fineness of a line, (photo)etching and a contrast ratio.

The foaming state refers to a state of a phenomenon in which graphite contained in a molded article absorbs laser light to generate heat, and polymers around it are thermally decomposed and foamed to form a marking. The foaming occurred in a micro state, and was observed with an electron microscope.

The fineness of a line was evaluated on the basis of whether or not a marking with characters having a line width of 0.1 mm or less could be carried out.

The etching was evaluated by measuring a marked portion for a depth with a surface roughness tester. The etching can be said to quantitatively show the degree of guarantee of the marking (degree of preservability of the marking).

For the contrast ratio, a background luminance (BL) and a characteristic luminance (CL) were measured. The luminance indicated a unit of $cd/cm^2$, and the diffused lighting having a luminance of 500±50 luxes was considered to be that observed as a side constraint. The contrast ratio was evaluated on the basis of BL:CL.

EXAMPLE 1 (SAMPLES NOS. 1-10) AND COMPARATIVE EXAMPLE 1 (SAMPLES NOS. 21 AND 22)

Samples Nos. 1 to 10 containing polyesters and various amounts of graphite were prepared, and molded into block-like articles according to a customary method. The resultant molded articles were evaluated on the marking properties with a YAG laser (laser marker SL 475E, supplied by NEC Corp.). Table 1 shows the polyester resin compositions (the graphile content) and the results of evaluation.

In addition, as Comparative Example 1, there were prepared compositions (Samples Nos. 21 and 22) containing polybutylene terephthalate (PBT) and carbon black in place of graphite, and their marking properties were evaluated. The compositions and the results of evaluation on marking properties are also shown in Table 1.

TABLE 1

| Sample | Polyester | Additive | Amount (wt. %) | Foamability mark of scanning line | mark of foaming | Fineness of line | Etching (μm) | Contrast ratio BL:CL |
|---|---|---|---|---|---|---|---|---|
| <Ex. 1> | | | | | | | | |
| No. 1 | PBT[*1] | graphite[*4] | 0 | unclear | nonuniform | good | 5 | 2.9:1 |
| 2 | " | " | 0.005 | clear | uniform | good | 24 | 6.8:1 |
| 3 | " | " | 0.05 | clear | uniform | good | 30 | 1:4.2 |
| 4 | " | " | 0.1 | clear | uniform | good | 36 | 1:4.7 |
| 5 | " | " | 1.0 | clear | uniform | good | 45 | 1:5.4 |
| 6 | " | " | 3.0 | unclear | nonuniform | good | 51 | 1:2.5 |
| 7 | PBN[*2] | " | 0.005 | clear | uniform | good | 25 | 7.0:1 |
| 8 | " | " | 0.5 | unclear | uniform | good | 43 | 1:5.6 |
| 9 | PEN[*3] | " | 0.005 | clear | uniform | good | 26 | 6.7:1 |
| 10 | " | " | 0.5 | unclear | uniform | good | 54 | 1:5.4 |
| <Com. Ex. 1> | | | | | | | | |
| 21 | PBT[*1] | carbon black[*5] | 0.005 | clear | nonuniform | good | 11 | 1:3.2 |

TABLE 1-continued

| Sample | Polyester | Additive | Amount (wt. %) | Foamability mark of scanning line | mark of foaming | Fineness of line | Etching (μm) | Contrast ratio BL:CL |
|---|---|---|---|---|---|---|---|---|
| 22 | " | carbon black*5 | 0.5 | unclear | nonuniform | good | 20 | 1:3.5 |

Notes:
*1 polybutylene terephthalate,
*2 polybutylene naphthalate,
*3 polyethylene naphthalate,
*4 CSPE supplied by Nippon Kokuen Kogyo K.K.,
*5 Denka carbon supplied by Denki Kagaku Kogyo K.K.
(These notes are to be applied to Tables hereinafter).

EXAMPLE 2 (SAMPLES NOS. 11 to 17) AND COMPARATIVE EXAMPLE 2 (SAMPLES NOS. 23 AND 24)

Table 2 shows the compositions of polyester resin molded articles prepared according to a customary method and the results of evaluation of the marking properties thereof with a $CO_2$ laser (Unimark 400, supplied by Ushio Inc.).

TABLE 2

| Sample | Polyester | Additive | Amount (wt. %) | Foamability amount of foaming | mark of foaming | Fineness of line | Etching (μm) | Contrast ratio CL:BL |
|---|---|---|---|---|---|---|---|---|
| <Ex. 2> | | | | | | | | |
| No. 11 | PBT*1 | graphite*4 | 0.0 | small | nonuniform | poor | 3 | 1.1:1 |
| 12 | " | " | 0.05 | large | uniform | good | 23 | 4.2:1 |
| 13 | " | " | 2.0 | large | uniform | good | 36 | 6.0:1 |
| 14 | PBN*2 | " | 0.05 | large | uniform | good | 20 | 3.9:1 |
| 15 | " | " | 2.0 | large | uniform | good | 34 | 5.8:1 |
| 16 | PEN*3 | " | 0.05 | large | uniform | good | 20 | 3.9:1 |
| 17 | " | " | 2.0 | large | uniform | good | 45 | 6.0:1 |
| <Com. Ex. 2> | | | | | | | | |
| 23 | PBT | carbon black*5 | 0.0 | small | nonuniform | poor | 7 | 1.3:1 |
| 24 | " | carbon black* | 2.0 | small | nonuniform | poor | 15 | 2.9:1 |

The above Examples 1 and 2 and Comparative Examples 1 and 2 clearly show that as the graphite amount is increased, the absorptivity to laser light increases and the etching is therefore apparently increased. It is also characteristically shown that when the graphite amount is 0.001 to 2.0% by weight, the contrast ratio is particularly high.

Concerning the compositions containing carbon black described in the Comparative Example, since the capacity of the carbon black to absorb laser light was small, the foaming occurred nonuniformly, and as a result, there was the decrease in the fineness of a line, the etching and the contrast ratio. Example 3 (Samples Nos. 31 to 34)

Various graphites were separately added to PBT, and the resultant compositions (molded articles) were evaluated for the effectiveness of the graphites for marking with a laser. Table 3 shows the species and average particle diameters of the graphites and the results on evaluation of the marking with a $CO_2$ laser.

TABLE 3

| Sample No. | Graphite species | Average particle diameter (μm) | Amount (wt. %) | Foamability | Fineness of line | Etching (μm) | Contrast ratio CL:BL |
|---|---|---|---|---|---|---|---|
| 31 | soil-like | 2-3 | 0.5 | good | good | 36 | 6.2:1 |
| 32 | scale-like | 4.5 | 0.5 | " | " | 37 | 6.0:1 |
| 33 | scale-like | 50-60 | 0.5 | " | " | 30 | 5.5:1 |
| 34 | soil-like | 70-90 | 0.5 | " | " | 31 | 5.2:1 |

The results in the above Table 3 show that with a decrease in the average particle diameter of the graphite, the contrast ratio increases. The reason therefor is considered to be that since a graphite having a smaller average particle diameter can be dispersed in the molded article surface to a greater extent, the composition has higher absorptivity to laser light.

EXAMPLE 4 (SAMPLES NOS. 41 TO 53) AND COMPARATIVE EXAMPLE 3 (SAMPLES NOS. 25 AND 26)

Samples Nos. 41 to 53 containing polyesters and various amounts of graphite and carbon black were prepared, and molded into block-like articles according to a customary method. The polyester resin compositions (molded articles) were evaluated on the marking properties with a YAG laser (laser marker SL 475E, supplied by NEC Corp.). Table 4 shows the compositions and the results of evaluation on the marking properties.

In addition, as Comparative Example 3, there were prepared molded articles formed from compositions (Samples Nos. 25 and 26) containing PBT and carbon black having low thermal conductivity, and the compositions (molded articles) were evaluated on the marking properties. Table 4 shows also the compositions and the results of marking properties.

when the amount of graphite and carbon black is 0.001 to 2.0% by weight, the contrast ratio is particularly high.

The compositions described in the Comparative Example contained carbon black in which the graphite formation did not advance and the secondary structure was not developed. Therefore, the capacity of the car-

TABLE 4

| Sample | Polyester | Graphite*5 | Carbon black*7 | Foamability mark of scanning line | mark of foaming | Fineness of line | Etching (μm) | Contrast ratio CL:BL |
|---|---|---|---|---|---|---|---|---|
| <Ex. 4> | | | | | | | | |
| No. 41 | PBT*1 | — | — | unclear | nonuniform | good | 5 | 2.9:1 |
| 42 | " | 0.005 | — | clear | uniform | good | 24 | 6.8:1 |
| 43 | " | 0.005 | 0.3 | clear | uniform | good | 45 | 1:6.0 |
| 44 | " | 0.1 | — | clear | uniform | good | 36 | 1:4.7 |
| 45 | " | 1.0 | — | clear | uniform | good | 45 | 1:5.4 |
| 46 | " | 3.0 | — | unclear | nonuniform | good | 51 | 1:2.5 |
| 47 | " | — | 3.0 | unclear | nonuniform | poor | 80 | 1:2.1 |
| 48 | PET*6 | 0.005 | — | clear | uniform | good | 30 | 6.3:1 |
| 49 | " | 0.005 | 0.3 | clear | uniform | good | 49 | 1:5.8 |
| 50 | PBN*2 | 0.005 | — | clear | uniform | good | 41 | 6.7:1 |
| 51 | " | 0.005 | 3.0 | clear | uniform | good | 60 | 1:6.0 |
| 52 | PEN*3 | 0.005 | — | clear | uniform | good | 29 | 6.5:1 |
| 53 | " | 0.005 | 0.3 | clear | uniform | good | 54 | 1:5.4 |
| <Com. Ex. 3> | polyester | carbon black*8 | | | | | | |
| 25 | PBT*1 | 0.005 | | clear | nonuniform | good | 11 | 1:3.2 |
| 26 | " | 0.3 | | clear | nonuniform | good | 12 | 1:2.5 |

Notes:
*6polyethylene terephthalate.
*7Denka carbon supplied by Denki Kagaku Kogyo K.K. (0.29 kcal/m · hr · °C.)
*8MA600B supplied by Mitsubishi Kasei Kogyo K.K. (0.18 kcal/m · hr · °C.)

EXAMPLE 5 (SAMPLES NOS. 54 TO 65) AND COMPARATIVE EXAMPLE 4 (SAMPLES NOS. 27 AND 28)

Table 5 shows the compositions of polyester resin molded articles prepared according to a customary method and the marking properties thereof with a $CO_2$ laser (Unimark 400, supplied by Ushio Inc.).

bon black to absorb laser light was small, and the foaming occurred nonuniformly. As a result, there was a decrease in the etching and the contrast ratio.

EXAMPLE 6 (SAMPLES NOS. 66 TO 69)

Various graphites were separately added to PBT, and the resultant compositions (molded articles) evaluated on the effectiveness of the graphites for the marking

TABLE 5

| Sample | Polyester | Graphite*5 | Carbon black*7 | Foamability amount of foaming | mark of foaming | Fineness of line | Etching (μm) | Contrast ratio BL:CL |
|---|---|---|---|---|---|---|---|---|
| <Ex. 5> | | | | | | | | |
| No. 54 | PBT*1 | — | — | small | nonuniform | poor | 3 | 1:1.1 |
| 55 | " | 0.05 | — | large | uniform | good | 23 | 1:4.2 |
| 56 | " | — | 0.5 | large | uniform | good | 35 | 1:3.2 |
| 57 | " | 0.05 | 0.3 | large | uniform | good | 39 | 1:6.0 |
| 58 | " | 1.0 | — | large | uniform | good | 42 | 1:5.0 |
| 59 | " | 1.0 | 0.2 | large | unfirom | good | 48 | 1:6.2 |
| 60 | PET*6 | 0.05 | — | large | uniform | good | 25 | 1:4.8 |
| 61 | " | 1.0 | 0.2 | large | uniform | good | 40 | 1:6.0 |
| 62 | PBN*2 | 0.05 | — | large | uniform | good | 28 | 1:5.3 |
| 63 | " | 1.0 | 0.2 | large | uniform | good | 45 | 1:6.3 |
| 64 | PEN*3 | 0.05 | — | large | uniform | good | 30 | 1:5.4 |
| 65 | " | 1.0 | 0.2 | large | uniform | good | 51 | 1:6.5 |
| <Com. Ex. 4> | polyester | carbon black*8 | | | | | | |
| 27 | PBT*1 | 0.05 | | small | nonuniform | good | 7 | 1:1.8 |
| 28 | " | 0.5 | | small | nonuniform | good | 10 | 1:1.0 |

The above Example and Comparative Example show that as the amount of graphite and carbon black having high thermal conductivity is increased, the absorptivity to laser light increases and the etching is therefore clearly increased. It is also characteristically shown that with a laser. Table 6 shows the species and average particle diameters of the graphites, the results of evaluation on the marking with a $CO_2$ laser, flame retardants and the results of a test on flame retardancy.

TABLE 6

| Sample | Graphite species Crystal form | Average particle diameter (μm) | Amount (wt. %) | Flame retardant[10] Amount (wt. %) | Flame retardant aid[11] Amount (wt. %) | Foam-ability | Fineness of line | Etching (μm) | Contrast ratio CL:BL | UL-94[9] |
|---|---|---|---|---|---|---|---|---|---|---|
| No. 66 | soil-like | 2–3 | 0.5 | 15 | 7 | uniform | good | 42 | 6.1:1 | V-0 |
| 67 | scale-like | 4.5 | 0.5 | 15 | 7 | " | " | 43 | 6.3:1 | V-0 |
| 68 | scale-like | 50–60 | 0.5 | 15 | 7 | " | " | 36 | 5.5:1 | V-0 |
| 69 | soil-like | 70–90 | 0.5 | 15 | 7 | " | " | 37 | 5.3:1 | V-0 |

Notes:

[9]UL-94 test: Five test pieces (thickness:1/32 inches) were tested on flame retardancy according to the method described in Subject 94 UL-94 of Underwriters Lab.
[10]FG 7100 (brominated polycarbonate) supplied by Teijin Chemicals, Ltd.
[11]ATOX-S (antimony trioxide) supplied Nippon Seiko K.K.

The results in the above Table 6 show that the smaller the average particle diameter is, the higher the contrast ratio is. The reason therefor is considered to be that since a graphite having a smaller average particle diameter is dispersed in the molded article surface in a lower degree, the composition has higher absorptivity to laser light.

What is claimed is:

1. A polyester resin composition comprising:
   (a) a thermoplastic polyester resin; and
   (b) a laser light absorbing agent selected from the group consisting of carbon black, graphite and a mixture thereof as a sole laser light absorbing agent, said carbon black having a thermal conductivity of not less than 0.2 kcal/m.hr. °C. and said graphite having an average particle diameter of 0.1 to 150 μm, in which the content of the above component (b) is from 0.001 to 2% by weight of the total weight of the components (a) and (b).

2. A composition according to claim 1, wherein the component (a) is polybutylene terephthalate.

3. A composition according to claim 1, wherein the component (a) is polyethylene terephthalate.

4. A composition according to claim 1, wherein the component (a) is polybutylene naphthalene dicarboxylate.

5. A composition according to claim 1, wherein the component (a) is polyethylene naphthalene dicarboxylate.

6. A composition according to claim 1, wherein the component (b) is a particulate, scale-like, soil-like or massive graphite.

7. A composition according to claim 1, wherein the component (b) is said highly thermally conductive carbon black having a thermal conductivity of not less than 0.2 kcal/m.hr. °C.

8. A composition according to claim 1, which contains (c) a bromine-containing flame retardant and (d) an antimony-containing flame retardant aid in addition to the components (a) and (b).

9. A polyester resin composition comprising:
   (a) a thermoplastic polyester resin,
   (b) a laser light absorbing agent selected from the group consisting of carbon black, graphite and a mixture thereof as a sole laser light absorbing agent, said carbon black having a thermal conductivity of not less than 0.2 Kcal/m.hr. °C. and said graphite having an average particle diameter of 0.1 to 150 μm,
   (c) a bromine-containing flame retardant, and
   (d) an antimony-containing flame retardant aid, and in which, based on the total amount of the components (a), (b), (c) and (d), the content of the component (a) is 58 to 96% by weight, the content of the component (b) is 0.001 to 2% by weight, the content of the component (c) is 2 to 25% by weight, and the content of the component (d) is 2 to 15% by weight.

10. A composition according to claim 1 or 9, which further contains not more than 70% by weight, based on the total weight of the composition, of (e) an inorganic filler.

11. A composition according to claim 8 wherein the bromine-containing flame retardant is selected from the group consisting of (I) brominated bisphenol A polycarbonate, (II) brominated bisphenol A epoxy resin and/or a modified product thereof obtained by blocking all or part of the terminal glycidyl groups thereof, (III) brominated diphenyl ether flame retardant, (IV) brominated imide flame retardant and (V) brominated polystyrene flame retardant.

12. The composition according to claim 11 wherein the brominated bisphenol A polycarbonate is present and has the general formula wherein is $Y^1$ is $Y^2$

X is bromine, n is an integer of from 2 to 30 and each of i, j, k and h is an integer of from 1 to 4.

13. The composition of claim 11 wherein the brominated bisphenol A epoxy resin and/or modified product thereof is present and has the general formula wherein X is bromine, i and j are each integers of from 1 to 4 and m is an average polymerization degree ranging from 0 to 40.

14. The composition of claim 8 wherein the brominated diphenyl ether flame retardant is present and has the general formula wherein X is bromine and $i'$ is an integer of from 1 to 5.

15. The composition of claim 11 wherein the brominated inside flame retardant is present and has the general formula wherein X is bromine, and i is an integer of from 1 to 4.

16. The composition of claim 11 wherein the brominated polystyrene flame retardant is present and has the following general formula wherein X is bromine, i is an integer of from 1 to 4, and l is an average polymerization degree ranging from 0 to 40.

17. The composition of claim 8 wherein the antimony-containing flame retardant aid (d) is selected from the group consisting of $Sb_2O_3$ and $pNa_2O\ Sb_2O_5\ gH_2O$ wherein p is 0 or 1 and q is 0 to 4.

18. The composition of claim 9 wherein the content of the flame retardant (c) is 8 to 20% by weight.

19. The composition of claim 9 wherein the content of component (d) is 4 to 10% by weight.

20. The composition of claim 10 which further comprises an additive selected from the group consisting of fillers, stabilizers, pigments, phosphorous-containing flame retardants and mixtures thereof.

21. The composition of claim 9 wherein the thermoplastic polyester resin (a) comprises polybutylene naphthalate, and the component (b) comprises 0.005 wt % of said graphite.

22. A moldable polyester resin composition receptive to marking with laser light, including a YAG laser and a carbon dioxide gas laser, said composition comprising
    (a) substantially linear saturated thermoplastic polyester resin comprising recurring units of butylene terephthalate, ethylene terephthalate, butylene naphthalene dicarboxyate, ethylene naphthalene dicarboxyate, ethylenenaphthalene dicarboxylate, and mixtures thereof,
    (b) 0.001 to 2.0% by weight of graphite having an average particle diameter of 0.1 to 150 μm and a powdery, scale-like, soil-like or massive crystal structure.

23. A molded article obtained from the composition of claim 22.

24. The molded article of claim 23 further comprising fine line markings thereon obtained by irradiating the molded article with laser light.

25. The molded article of claim 23 containing from 0.001 to 0.005% by weight of said graphite.

26. The molded article of claim 25 further comprising fine line markings thereon obtained by irradiating the molded article with YAG laser light, said molded article being substantially white and said fine line markings being substantially black.

27. The molded article of claim 23 containing from about 1 to 2% by weight of said graphite.

28. The molded article of claim 27 further comprising fine line markings obtained by irradiation with laser light, said molded article being substantially black and said fine line markings being substantially white.

* * * * *